E. W. SERRELL.
VEHICLE SUSPENSION.
APPLICATION FILED JUNE 16, 1914.
1,188,685.
Patented June 27, 1916.
2 SHEETS—SHEET 2.
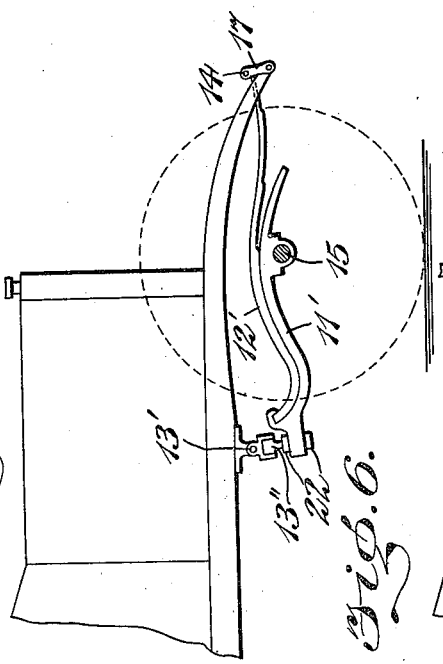
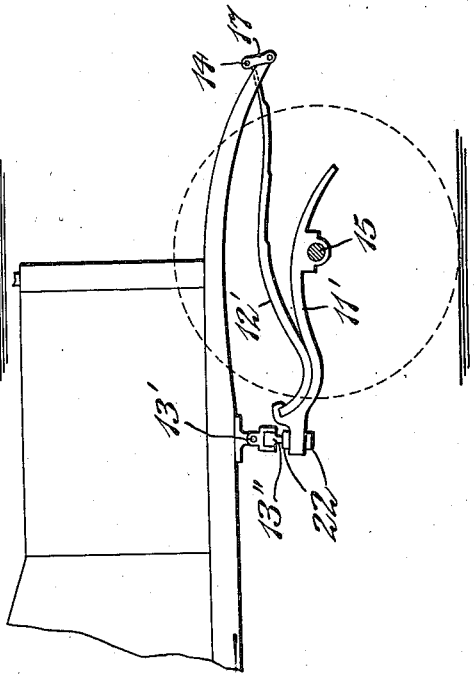
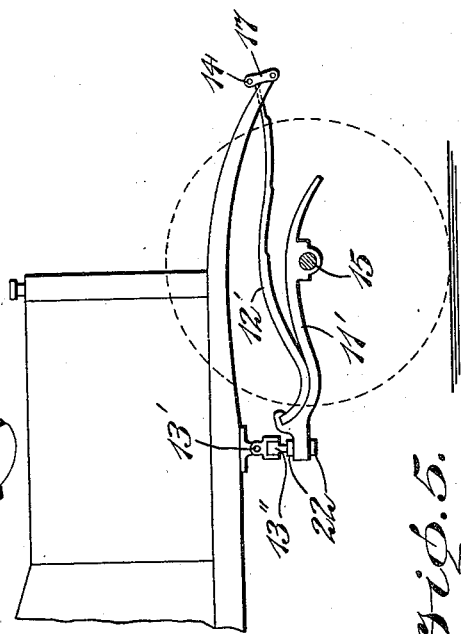
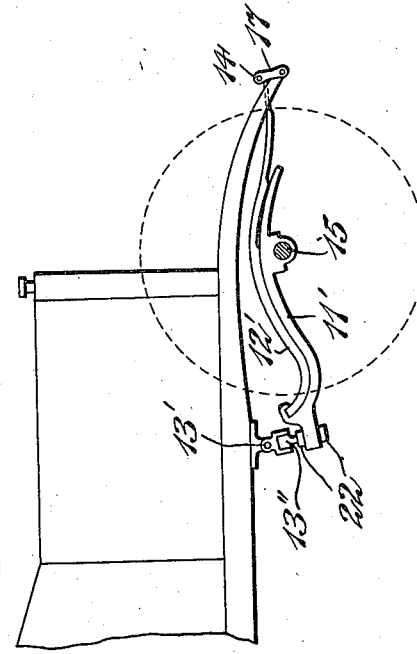
WITNESSES
A. C. Abbott
L. E. Morrison
INVENTOR
Edward William Serrell
BY Wm. J. Dolan
ATTORNEY

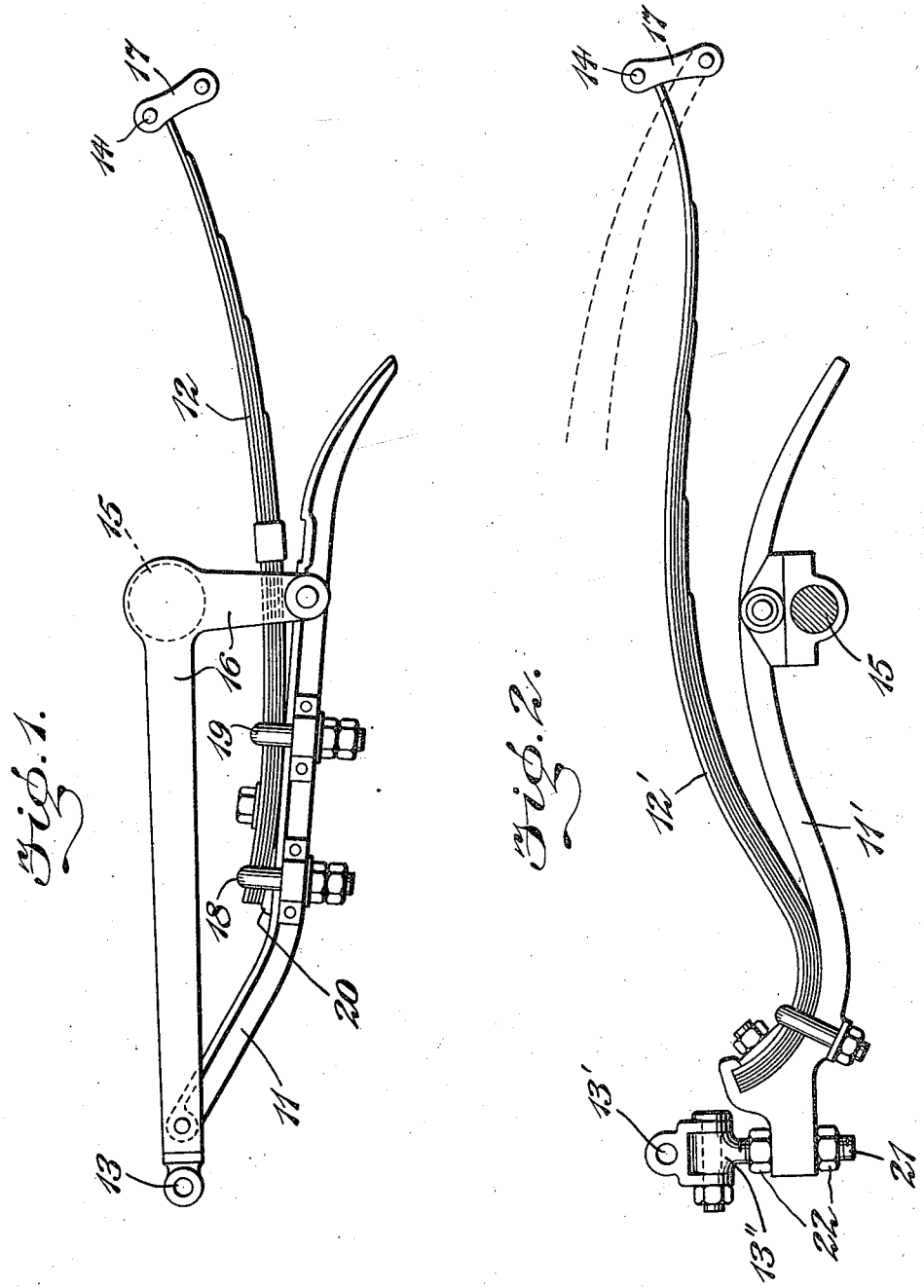

UNITED STATES PATENT OFFICE.

EDWARD WILLIAM SERRELL, OF CHABEUIL, FRANCE.

VEHICLE SUSPENSION.

1,188,685.

Specification of Letters Patent. Patented June 27, 1916.

Application filed June 16, 1914. Serial No. 845,374.

*To all whom it may concern:*

Be it known that I, EDWARD WILLIAM SERRELL, a citizen of the United States, at present residing in Chabeuil, France, (whose post-office address is Pearl River, Rockland county, New York,) have invented a new and useful Improvement in Vehicle Suspentions, of which the following is a specification.

This invention relates to resilient means of suspension for the bodies of vehicles.

One object of the invention is to produce an improved suspending means capable of controlling progressively the action of the springs or other resilient media employed, to offset vibrations and shocks of all sorts, irrespective of variation in the loads carried.

Another object is to avoid synchronism or cumulation of oscillations in both the suspending and suspended parts, together with such disadvantages as result therefrom.

The invention involves the use of a rocker and a leaf-spring, combined in such a manner that a progressive resistance is offered by the former to a continued flexure of the latter, so that the lighter vibrations are thereby obliterated, while the heavier shocks do not cause any greater displacements than are foreseen in designing the construction. In practice, the most suitable curve for flexing the spring, and along which it progressively develops its resistance, is not always the same, and varies considerably in accordance with the weight and dimensions of the vehicle, the loads carried by the latter, and its normal speed of travel. Consequently, it is useful to possess a practical means whereby the curve of resistance to flexure may be varied beyond the usual limits. Besides, in every system of suspension, it is advantageous to reduce as much as possible that part of the weight which is not suspended, and so to dispose the greatest part of the aggregate weight that the inertia of its mass will tend to bring the springs into play. Often, it is also useful to have the spring of a vehicle effectively longer than is permitted by obstacles in the structure when the forms of springs hitherto used are employed.

In many instances, especially in the case of automobiles, it is useful to maintain a constant distance between the axle and one of the two points of attachment of the spring or system of suspension. For example, the steering of an automobile is interfered with if the front axle be displaced owing to the action of the springs. As to the rear springs, they are frequently used also as a means of resistance to the strains due to the action of the motor, the springs then acting as an organ of suspension, a thrust rod, and a strut. In the manufacture of automobiles, the frame or chassis with all its organs is generally constructed in accordance with a uniform series of designs and carries the means of suspension. The coach body or tonneau, on the other hand, is of varying form, and sometimes its weight differs from that for which the springs were designed. Then it becomes useful, even with progressively-acting springs, to have a means of adjustment enabling the vehicle to be properly seated when the body thereof is applied. Finally, in order to increase the sensitiveness of a system of suspension, it is sometimes of benefit (especially when remodeling a previously built vehicle) to adapt thereto the present invention as an auxiliary suspending means in combination with a main spring.

The several desirable features of construction above outlined will be found to have been incorporated in the improved resilient suspending means forming the subject-matter hereof, a practicable embodiment of which is illustrated in the accompanying drawings, wherein—

Figure 1 is a side elevation, showing the combined rocker and spring aforesaid adapted for use in connection with the rear axle of an automobile of the type in which the spring passes under the axle, and where the suspension is utilized as a thrust rod, counterbalancing the reaction of the motor upon the wheels. Fig. 2 shows a device similar to the preceding, but adaptable to types of vehicles wherein the rear springs pass above the axle, and also modified in other respects. Figs. 3 to 6, inclusive, illustrate more or less diagrammatically some relative or interrelated movements of the said rocker and spring in varying conditions.

Referring to Fig. 1, the numerals 11 and 12 respectively represent the said rocker and spring, and 13, 14, designate the outer ends thereof, to which the vehicle body is attached. The end 13 of the rocker affords a bearing for a swivel (not shown) permitting movement of the suspended body at an angle with relation to the vehicle axle 15, to which the rocker is connected by an L-shaped support 16, forming part of the latter. The end 14 of the spring is jointed to the vehicle body by links 17, in the usual manner.

The rocker 11, as shown in Fig. 1, has two branches and in fact is an appendage of the axle 15. But there is provided a vacant space or clearance under the axle to allow free oscillation of the spring 12, which is securely attached at the inner end to the rocker 11, by means of straps 18, 19, and is brought to bear by the same end upon a wedge 20, interposed between the spring and rocker within the strap 19. It is understood that the angles and points of contact of the spring 12 with the rocker 11 are easily regulated by increasing or diminishing the thickness of this wedge.

A close observation of the above described arrangement of parts readily shows they admit of the use of a spring which is much longer than can be employed with the disposition of elements followed heretofore, with the same obstacles encountered in the structure, and more flexible according to strains and reactions.

It is to be noted that if the axle 15 is swiftly raised by the wheel of the vehicle, as the result of a sudden shock, this movement of the axle meets with no resistance which is inelastic and direct. When such a movement takes place, the inertia of the whole mass of the rocker and spring which lies on the side of the part 13 relatively to the axle tends to render such masses immovable in space; hence a tendency to revolve about the axle 15 as a center. This tendency to rotate is resisted by the combined action of the spring and rocker in a manner which is quite apparent upon inspection of the drawing. Once the parts are in movement, the action is that of a spring which is very long and has the flexibility, period and curve of resistance that would have been given to it by construction and displacing the lines of contact between the spring and the rocker. But this setting in motion, at the time a shock occurs, does not have the instantaneity nor the violence attending the beginning of movement of an ordinary spring, and a large portion of the mass of the spring and rocker tends by its inertia to deaden the movement, whereas in an ordinary spring the bulk thereof (which is near the axle and the heavier part) is practically integral with the axle, and through its acquired speed, when a movement takes place, tends to transmit this movement to the suspended parts of the vehicle. The result gained from that difference of operation, is that the suspending means, while resisting severe shocks in a substantially perfect manner, are much better adapted than any other known system for the absorption and checking of light vibrations, thus affording a soft and smooth medium of suspension for the vehicle greatly superior to what is ordinarily obtained.

The main parts hereinbefore enumerated are also found in Fig. 2, though of slightly different form. Practically, the only difference of construction of the device, as exemplified in this view, is that the rocker 11' rests upon the axle 15, instead of being suspended therefrom as represented in Fig. 1, but both forms of the rocker, it will be observed, are carried by the axle and intermediately fulcrumed for oscillation about its longitudinal axis or middle longitudinal line. The position of the spring 12' naturally follows that of the rocker 11' in Fig. 2, above the axle. The relative height of the parts is also adjusted by different means. Instead of the swivel bearing part 13, previously described, the latter-named figure includes a jointed part 13', having a second knuckle 13'', turned at 90° relatively to the first and adapted for an inclined movement. The height of the rocker is here regulated by means of a screw-rod 21 and nuts 22, in an obvious manner.

In order to increase the sensitiveness of the suspension, either of the system herein set forth or of the ordinary system, the present invention could be easily embodied therein also as an auxiliary suspending means, to fill the office of small shock-absorbers, frequently used at the ends of the main springs. To do this, it is sufficient to equip these small supplementary springs with rockers of suitable form, as will be readily comprehended without further explanation.

I claim:

1. The combination with the frame and axle of a vehicle, of a rocker intermediately fulcrumed so as to oscillate about the axle in a substantially constant relation, and resilient suspending means connected with said rocker at one end and with the frame at the other end, the rocker being jointed to the frame inwardly of the axle and projecting outwardly of the latter under said suspending means.

2. The combination with the frame and axle of a vehicle, of a rocker flexibly attached to the frame at one end and fulcrumed on the axle near its other end, a spring connected with said rocker at one side of the axle, and means suspending the frame from said spring on the opposite side of the axle.

3. The combination with the frame and axle of a vehicle, of a rocker jointed to the frame and fulcrumed on the axle, a spring having one end adjustably connected with said rocker intermediately thereof, a wedge under said spring end, and a suspending connection between the frame and the other end of said spring permitting the latter to be flexed against the rocker.

4. The combination with the frame and axle of a vehicle, of a rocker fulcrumed for oscillation about the middle longitudinal line of the axle, means affording a flexible joint for one end of said rocker with the frame, the other end of the rocker extending beyond the axle, a spring attached by one end to the rocker intermediately of its said joint and its fulcrum, and a connection between the other end of said spring and the frame.

5. The combination with the frame and axle of a vehicle, of a rocker intermediately oscillatable about the axle, a swiveling connection between one end of said rocker and the frame, a spring secured to the rocker on one side of the axle, and means on the other side of the axle for connecting the frame with said spring.

6. The combination with an axle and a vehicle frame, of a rocker and a leaf-spring arranged to lap transversely of the axle so as to permit them to bear jointly upon the latter at their inner ends, and suspending means for the frame connected with the outer ends of said rocker and said leaf-spring.

7. The combination with the frame and axle of a vehicle, of a rocker and a spring lapped so as to enable them to bear one upon the other at their inner ends in a longitudinal direction, means flexibly joining the outer ends of said rocker and said spring to the frame, and a fulcrum permitting flexure of the spring upon the rocker about the axle.

In witness whereof I have signed this specification in the presence of two witnesses.

EDWARD WILLIAM SERRELL.

Witnesses:
F. VAN DYNE,
MARIN VACHON.